US010480946B2

(12) United States Patent
Jo et al.

(10) Patent No.: US 10,480,946 B2
(45) Date of Patent: Nov. 19, 2019

(54) VEHICLE AND METHOD OF PROVIDING INFORMATION THEREFOR

(71) Applicants: HYUNDAI MOTOR COMPANY, Seoul (KR); KIA MOTORS CORPORATION, Seoul (KR)

(72) Inventors: Kyu Hwan Jo, Seoul (KR); Joon Young Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 195 days.

(21) Appl. No.: 15/852,246

(22) Filed: Dec. 22, 2017

(65) Prior Publication Data
US 2019/0003835 A1    Jan. 3, 2019

(30) Foreign Application Priority Data

Jun. 30, 2017    (KR) .................. 10-2017-0083486

(51) Int. Cl.
G01C 21/16 (2006.01)
G01C 21/36 (2006.01)
(Continued)

(52) U.S. Cl.
CPC .......... *G01C 21/165* (2013.01); *B60W 50/14* (2013.01); *G01C 21/3629* (2013.01);
(Continued)

(58) Field of Classification Search
CPC .. B60L 15/20; B60L 15/2045; B60L 15/2009; B60K 35/00; B60K 28/06; B60K 17/28; B60W 30/08; B60W 30/0953; B60W 30/188; B60W 30/18127; B60W 40/08; B60W 30/0956; B60W 40/072; B60W 30/09; B60W 10/18; B60W 30/181; B60W 10/04; B60W 10/06; B60W 10/023; B60W 10/026; B60W 30/18072; B60W 30/192; B60W 50/14; G01M 17/013; G01M 17/0078; G05D 1/02; G05D 1/0891;
(Continued)

(56) References Cited

U.S. PATENT DOCUMENTS

2013/0261952 A1*  10/2013  Aso ................... B60W 30/0953
                                                            701/301
2016/0288789 A1*  10/2016  Durgin ................. B60W 30/16
(Continued)

FOREIGN PATENT DOCUMENTS

JP    2008-030677 A    2/2008
JP    2009-035222 A    2/2009
(Continued)

Primary Examiner — Behrang Badii
(74) Attorney, Agent, or Firm — Morgan, Lewis & Bockius LLP

(57) ABSTRACT

A vehicle and a method of guiding an inertial driving timing of a vehicle includes storing pass-through speeds for respective deceleration situation types, sensing occurrence of a deceleration situation on a route, calculating a target speed corresponding to a type of the sensed deceleration situation based on the stored pass-through speeds for the respective deceleration situation types, and determining an inertial driving guidance timing using the calculated target speed.

19 Claims, 5 Drawing Sheets

(51) Int. Cl.

| | | |
|---|---|---|
| *B60W 50/14* | (2012.01) | |
| *G06F 3/041* | (2006.01) | |
| *B60L 15/20* | (2006.01) | |
| *G08G 1/0967* | (2006.01) | |
| *B60K 35/00* | (2006.01) | |
| *B60W 30/08* | (2012.01) | |
| *B60R 21/00* | (2006.01) | |
| *B60W 40/08* | (2012.01) | |
| *G06F 3/0484* | (2013.01) | |
| *B60W 30/00* | (2006.01) | |

(52) U.S. Cl.
CPC ............... *B60K 35/00* (2013.01); *B60L 15/20* (2013.01); *B60R 21/00* (2013.01); *B60W 30/00* (2013.01); *B60W 30/08* (2013.01); *B60W 40/08* (2013.01); *G06F 3/041* (2013.01); *G06F 3/04845* (2013.01); *G08G 1/096708* (2013.01)

(58) Field of Classification Search
CPC ....... F01N 13/20; F01N 13/082; G08G 1/166; G08G 1/096708; G08G 1/09; G08G 1/161; F16H 47/02; F16H 57/021; F16H 45/02; G01C 21/165; G01C 21/3629; G06F 3/04845; G06F 3/0418; G06F 3/03547; G06F 3/0346; G06F 3/0488; G06F 3/0416; B62K 11/007; A01B 76/00; G06K 9/00845; F02D 41/126; F16D 48/062

See application file for complete search history.

(56) References Cited

U.S. PATENT DOCUMENTS

| | | | |
|---|---|---|---|
| 2017/0219459 A1* | 8/2017 | Liu | G01M 17/013 |
| 2017/0297567 A1* | 10/2017 | Matsumura | B60W 30/08 |
| 2017/0322664 A1* | 11/2017 | Park | B60K 35/00 |
| 2018/0141461 A1* | 5/2018 | Sano | B60L 15/20 |

FOREIGN PATENT DOCUMENTS

| | | |
|---|---|---|
| JP | 2009-126255 A | 6/2009 |
| KR | 10-1519214 | 5/2015 |
| WO | 2012-129424 A2 | 9/2012 |

\* cited by examiner ved by reference as if fully set forth
VEHICLE AND METHOD OF PROVIDING INFORMATION THEREFOR This application claims the benefit of priority of Korean Patent Application No. 10-2017-0083486, filed on Jun. 30, 2017 in the Korean Intellectual Property Office (KIPO), which is hereby incorporated by reference as if fully set forth herein.

BACKGROUND

Field

The present disclosure relates to a vehicle and a method of providing information therefor and, more particularly, to a method of informing a driver of a vehicle about a timing at which the driver needs to release an accelerator pedal of the vehicle to start coasting (coasting means that the tires of the vehicle are not being 'driven' or propelled by the engine even though the vehicle is actually moving) at a proper time when a deceleration situation of an area in a forward path in front of the vehicle forward-driving along a route is expected, and a vehicle for performing the same.

Discussion of the Related Art

With increasing demand for improvement in fuel efficiency of a vehicle and reinforcement of emission regulations of each country, demand for eco-friendly vehicles has been increasing. As a realistic alternative to such demand, hybrid vehicles or electric vehicles have emerged.

However, these vehicles need to be equipped with powertrains and control systems which are different from those of general internal combustion engine vehicles. Accordingly, methods of improving fuel efficiency and reducing exhaust gas, which are different from methods applicable to general internal combustion engine vehicles, are needed.

As one method, when a deceleration situation is scheduled or expected in a driver's forward direction, if the driver takes his/her foot away from an accelerator pedal of a vehicle at a proper timing to cause the vehicle to coast (coasting means that the tires of the vehicle are not being propelled by the engine while the vehicle is moving), unnecessary fuel consumption may be prevented. That is, if it is possible to decelerate through coasting during driving, fuel consumption may be reduced, because deceleration is performed by a loss of kinetic energy caused by internal friction of a driving system, friction between tires and a road surface, and/or variation in road inclination, while driving is performed only with inertia of the vehicle without using a brake.

Particularly, deceleration through inertial driving may be more useful if a deceleration situation of an area in a forward path in front of the vehicle forward-driving along a route (e.g., a speed bump, a speed camera, a school zone, a tollgate, a sharply curved section, a traffic light, an entrance/exit road including a ramp, and a U-turn/left-turn/right-turn, etc.) can be accurately predicted using recently introduced high-precision maps and vehicle sensors. This is described with reference to FIG. 1.

FIG. 1 is a view for explaining the concept of general inertial driving guidance.

Referring to FIG. 1, when a vehicle acquires information about a deceleration situation of an area in a forward path in front of the vehicle forward-driving along a route (hereinafter, "front deceleration situation") through high-precision maps and vehicle sensors, the remaining distance to the deceleration situation and a target speed may be calculated. If the calculated information is matched with inertial driving distance profiles for each vehicle and for different speeds of the vehicle acquired via tests and the like, a required inertial driving distance, which is a distance required for inertial driving to reach the target speed at a current vehicle speed, may be calculated. Accordingly, if the vehicle informs a driver about an alarm in a predetermined form at a timing when the remaining distance to the front deceleration situation reaches the required inertial driving distance, the driver may begin inertial driving by releasing their foot away from an accelerator pedal at an alarm timing.

Thus, unnecessary fuel consumption is reduced by the amount of time while the driver drives after first releasing the foot away from the accelerator pedal comparing with the case in which the driver performs braking via pressing a brake after visually recognizing the front deceleration situation.

However, such a method of guiding the driver through an inertial driving timing uniformly calculates the required inertial driving distance according to a current speed, a target speed, and the remaining distance. Accordingly, guidance for the driver on a timing of releasing the accelerator pedal does not consider the type of the deceleration situation (such as roadside speed camera, speed bump, tollgate, curved road, etc.) or the tendency of the driving style of the driver.

SUMMARY

Accordingly, the present disclosure is directed to a vehicle and a method of providing information therefor that substantially obviate one or more problems due to limitations and disadvantages of the related art.

An object of the present disclosure is to provide a method of efficiently adjusting an inertial driving guidance timing in a vehicle and a vehicle for performing the same.

Another object of the present disclosure to provide a method capable of performing inertial driving guidance optimized for each front deceleration situation and each driver and a vehicle for performing the same.

The technical objects that can be achieved through the present disclosure are not limited to what has been particularly described hereinabove and other technical objects not described herein will be more clearly understood by persons skilled in the art from the following detailed description.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of guiding an inertial driving timing of a vehicle includes storing pass-through speeds for respective deceleration situation types, sensing occurrence of a deceleration situation on a route, calculating a target speed corresponding to a type of the sensed deceleration situation based on the stored pass-through speeds for the respective deceleration situation types, and determining an inertial driving guidance timing using the calculated target speed.

In another aspect of the present disclosure, a vehicle includes a deceleration situation sensing unit configured to sense whether or not a deceleration situation occurs, and a guidance information control unit configured to acquire information about the sensed deceleration situation from the deceleration situation sensing unit to store pass-through speeds for respective deceleration situation types, calculate a target speed corresponding to a type of the sensed deceleration situation based on the stored pass-through speeds for the respective deceleration situation types, and determine an inertial driving guidance timing using the calculated target speed.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
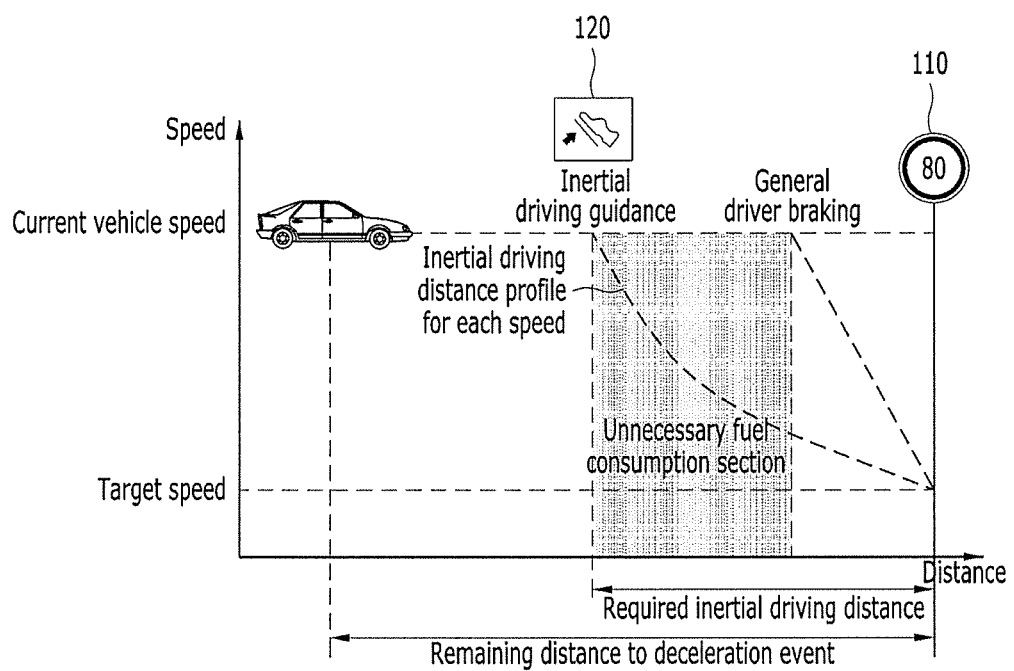
FIG. 1 is a view for explaining the concept of general inertial driving guidance.

Reference will be made in detail to the exemplary embodiments of the present disclosure, examples of which are illustrated in the accompanying drawings. The present disclosure may, however, be embodied in many different forms and should not be construed as limited to the embodiments set forth herein. In order to clearly illustrate the present disclosure in the drawings, parts not related to the description are omitted, and like parts are denoted by similar reference numerals throughout the specification.

Throughout the specification, when a part is referred to as "including" an element, the part may include other elements as well, unless specifically stated otherwise. In addition, parts denoted by the same reference numerals throughout the specification denote the same components.

If guidance on inertial driving is provided to a driver with a target speed uniformly fixed, it is difficult to satisfy all of various drivers' driving tendencies. Therefore, an embodiment of the present disclosure proposes providing a function of adjusting an inertial driving guidance timing using a predetermined command input system. This is described with reference to FIG. 2.

Figure 2:
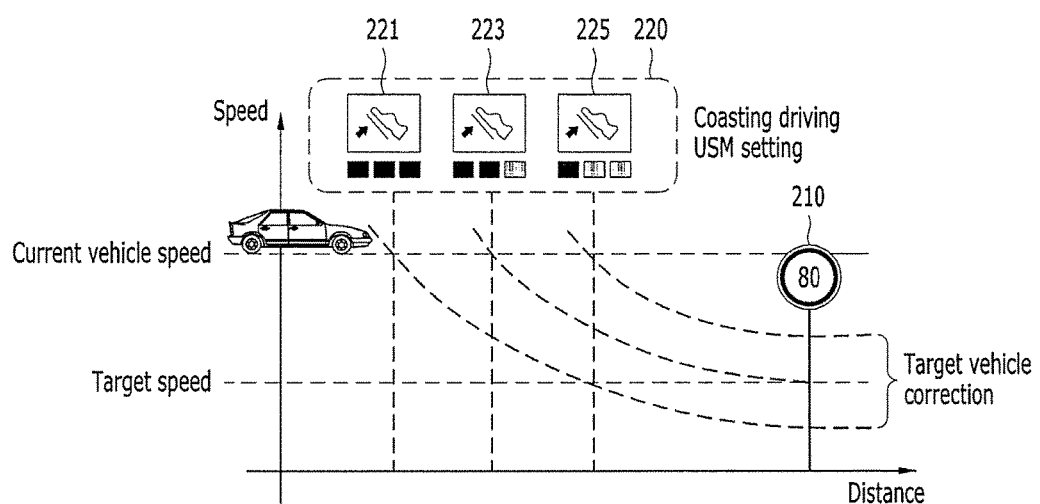
FIG. 2 is a view for explaining the concept of an inertial driving guidance timing through user setting according to an embodiment of the present disclosure.

FIG. 2 is a view for explaining the concept of an inertial driving guidance timing through user's setting according to an embodiment of the present disclosure.

Referring to FIG. 2, a function of adjusting an inertial driving guidance timing ("Fast"/"Normal"/"Slow") is applied through a user setting menu (USM) 220 of a cluster or an audio/video/navigation (AVN) system. Upon occurrence of a deceleration situation 210, the target speed at the occurrence point of the deceleration situation may be corrected according to the user (the driver)'s selected setting in the USM.

For example, if the driver or user sets a guidance timing to "Normal" 223, an accelerator pedal is released by the driver at the inertial driving guidance timing and a target vehicle speed when the vehicle reaches the occurrence point of the deceleration situation 210 may be determined to be equal to a preset target vehicle speed of the deceleration situation 210.

As another example, if the driver sets the guidance timing to "Fast" 221, the accelerator pedal is released by the driver at the inertial driving guidance timing and the target vehicle speed when the vehicle reaches the occurrence point of the deceleration situation 210 may be determined to be lower than the target vehicle speed of the deceleration situation 210. Such setting may be appropriate for a driver who considers fuel efficiency as important or desires to drive at a low speed.

As another example, if the driver sets the guidance timing to "Slow" 225, the accelerator pedal is released by the driver at the inertial driving guidance timing and the target vehicle speed when the vehicle reaches the occurrence point of the deceleration situation 210 may be determined to be higher than the target vehicle speed of the deceleration situation 210. Such setting may be appropriate for a driver who desires to perform sporty or fast driving.

The front deceleration situation 210 includes various types of situations (e.g., a speed camera, speed bump, a curved road, a tollgate, etc.). Even if the USM is provided, it is impossible for the driver to change a desired guidance timing whenever a front deceleration situation occurs. Accordingly, a method of positively coping with variation in sensitivity of a guidance timing of the driver for each deceleration situation during driving may be considered.

To this end, another embodiment of the present disclosure proposes learning a pass-through speed of the driving style of the driver for each front deceleration situation, determining a target speed for each situation using the result of learning, and providing the driver with inertial driving guidance at a timing when the determined target speed is satisfied. This is described with reference to FIG. 3.

Figure 3:
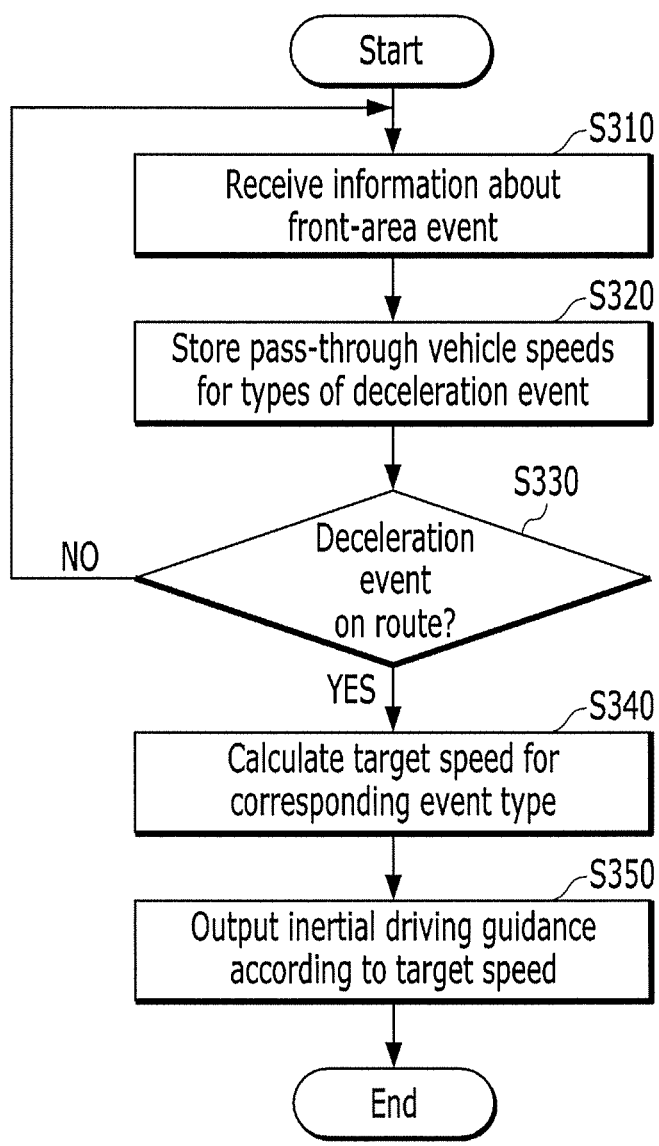
FIG. 3 is a flowchart illustrating an exemplary procedure of determining an inertial driving guidance timing according to another embodiment of the present disclosure.

FIG. 3 is a flowchart illustrating an exemplary procedure of determining an inertial driving guidance timing according to another embodiment of the present disclosure.

Referring to FIG. 3, information about a front-area deceleration situation may be received (S310). The information about the front deceleration situation may be generated through at least one of various sensors or a navigation system of a vehicle. The types of the front deceleration situation may include a speed bump, a speed camera, a school zone, a tollgate, a sharply curved section, a traffic light, an entrance/exit road including a ramp, and a U-turn/left-turn/right-turn section according to guidance of a navigation system. However, these are purely exemplary and the present embodiment is not limited thereto. For example, the front deceleration situation according to the present embodiment is not limited to any situation so long as a remaining forward distance in the forward path in front of the vehicle forward-driving along a route is previously sensed through a sensor and a navigation system.

If front deceleration situations are sensed and the deceleration situations occur, the vehicle's speeds passing through the occurrence points of the deceleration situations (i.e. pass-through speeds of the vehicle) are separately stored according to types of the deceleration situations (S320).

For example, a pass-through speed of the vehicle when the vehicle passes through a speed camera and a pass-through vehicle speed when the vehicle passes through a sharply curved section may be separately stored. In addition, even when the vehicle passes through a speed camera, a pass-through vehicle speed when the vehicle passes through a speed camera for limiting speed to 60 kilometers/hour or less and a pass-through vehicle speed when the vehicle passes through a speed camera for limiting speed to 80 kilometers/hour or less may be separately stored. These storage processes may be accumulatively performed and may be performed regardless of whether a route is set through the navigation system.

If an occurrence of the front deceleration situation is sensed on a driving route (or a route set through the navigation system) (S330), an average target speed for a deceleration situation type corresponding to the deceleration situation may be calculated (S340) using the pass-through speeds that are accumulatively stored with respect to the deceleration situation types.

If an accelerator pedal release timing is determined using the calculated target speed, inertial driving guidance may be output at the accelerator pedal releasing timing (S350).

If the above-described target speed calculation method is used, it is unnecessary to set an additional USM and inertial driving guidance is provided such that a pass-through speed may be satisfied according to a usual driving tendency of a driver. Therefore, positive effects can be expected in terms of improvement in performance of an inertial driving guidance function and in customer satisfaction and in terms of sensitivity.

The procedure described with reference to FIG. 3 will now be described in more detail with reference to FIG. 4.

Figure 4:
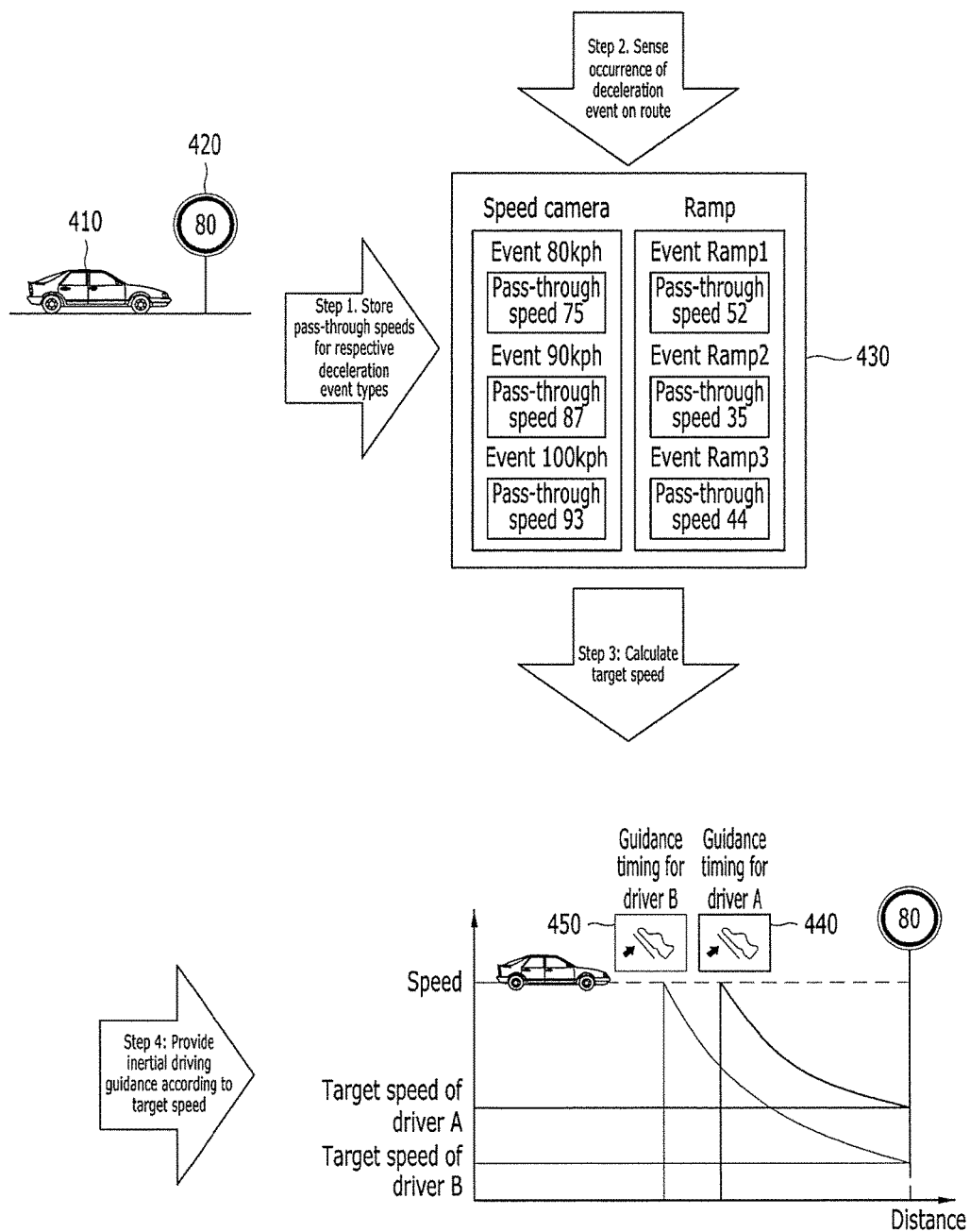
FIG. 4 is a view illustrating another exemplary procedure of determining an inertial driving guidance timing according to another embodiment of the present disclosure.

FIG. 4 is a view illustrating another exemplary procedure of determining an inertial driving guidance timing according to another embodiment of the present disclosure.

Referring to FIG. 4, information about pass-through vehicle speeds when a vehicle 410 passes through a front deceleration situation 420 may be accumulatively stored with respect to deceleration situation types (Step 1).

Next, when a deceleration situation is sensed on a driving route (Step 2), a target speed corresponding to a situation type may be calculated with reference to information 430 about the pass-through speeds accumulatively stored with respect to the deceleration situation types (Step 3).

Thus, the inertial driving guidance timing is determined so that the calculated target speed may be the vehicle's speed when the vehicle passes through an occurrence point of the deceleration situation and the inertial driving guidance may be provided to the driver of the vehicle 410 at the inertial driving guidance timing (step 4).

That is, the inertial driving guidance timing may be determined such that an accelerator pedal is released at the inertial driving guidance timing so as to start inertial driving and the vehicle's speed when the vehicle passes through the occurrence point of the deceleration situation becomes the target speed. To this end, a required inertial driving distance, which is a distance required to reduce the vehicle's current speed to the target vehicle speed through inertial driving, may be calculated. The required inertial driving distance may be calculated with reference to a prestored inertial driving distance profile with respect to different speeds of the vehicle.

When the above-described control operation is performed, it is assumed that pass-through speeds of vehicles driven by driver A and driver B who drive the same vehicle type (i.e., an inertial driving distance profile with respect to different speeds of the vehicle is applied) pass through a corresponding deceleration situation are accumulatively stored. Generally, when driver A has had a tendency to drive at a high pass-through vehicle speed and driver B has had a tendency to drive at a low pass-through vehicle speed, a timing at which an inertial driving guidance 440 is provided to driver A is later than a timing at which an inertial driving guidance 450 is provided to driver B.

Next, a vehicle structure in which the above-described method may be performed is described with reference to FIG. 5.

Figure 5:
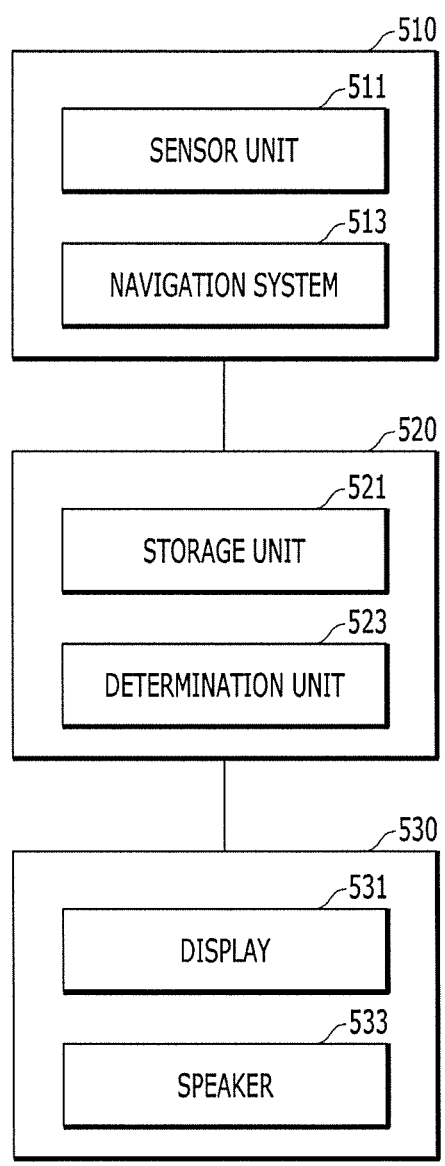
FIG. 5 is a block diagram illustrating an exemplary vehicle structure according to another embodiment of the present disclosure.

FIG. 5 is a block diagram illustrating an exemplary vehicle structure according to another embodiment of the present disclosure. Constituent elements illustrated in FIG. 5 are only some of the constituent elements required to perform the present embodiment and it is apparent that a greater number of constituent elements may be included in a vehicle.

Referring to FIG. 5, a vehicle according to the present embodiment may include a deceleration situation sensing unit 510, a guidance information control unit 520, and an output unit 530. Hereinafter, the respective units are described in detail.

The deceleration situation sensing unit 510 serves to sense whether or not a front deceleration situation occurs and transmits information about the sensed front deceleration situation to the guidance information control unit 520. The deceleration situation sensing unit 510 may include at least one of a sensor unit 511 or a navigation system 513. The sensor unit 511 may serve to sense whether or not the front deceleration situation occurs through sensing information and may include a radar, a distance sensor, a vehicle speed sensor, and a camera. However, this is purely exemplary and any sensor may be applied only if the sensor can sense the front deceleration situation.

The navigation system 513 may determine whether or not the front deceleration situation occurs, using map information (e.g., information using a precise digital map), based on the shapes/types of roads or the periphery of the roads (e.g., a ramp, a sharp curve, and a school zone) present on a current driving route, facilities on or around the roads (e.g., a speed bump and a speed camera), or variation in a driving direction (e.g., left turn, right turn, or U-turn) while route guidance is performed.

Upon sensing the front deceleration situation, the deceleration situation sensing unit 510 may transmit information about a pass-through vehicle speed of the corresponding situation to the guidance information control unit 520 together with information about the type of the corresponding situation, regardless of whether or not the route is set through the navigation system 513.

The guidance information control unit 520 may include a storage unit 521, which receives information about pass-through speeds of a driver for respective situation types from the deceleration situation sensing unit 510 and accumulatively stores the information about the pass-through vehicle speeds, and a determination unit 523, which calculate a target vehicle speed corresponding to a corresponding situation type and determines an inertial driving guidance timing according to the target vehicle speed, upon receiving the information about the front deceleration situation from the deceleration situation sensing unit 510.

The storage unit 521 may further store information about an inertial driving distance profile with respect to different speeds of a corresponding vehicle, in addition to the information about the pass-through vehicle speeds for respective situation types.

The guidance information control unit 520 may request the output unit 530 or control the output unit 530 to output guidance information through the output unit 530 at the determined inertial driving guidance timing.

The output unit 530 may include at least one of a display 531 for visual guidance output or a speaker 533 for auditory guidance output. The display 531 may include at least one of at least one area of a cluster, a head-up display (HUD), or a display of an AVN system. However, this is purely exemplary and any type of vehicle display may be applied so long as the display can visually guide an inertial driving timing.

In the above-described vehicle structure, two or more constituent elements described as different elements may be implemented as one device in an actual vehicle and a single constituent element may be implemented as two or more devices having distributed functions thereof in an actual vehicle.

For example, all of the deceleration situation sensing unit 510, the guidance information control unit 520, and the output unit 530 may be implemented to perform the respective functions together via an AVN system. As another example, the guidance information control unit 520 and the output unit 530 may be configured together to be included in a cluster.

A vehicle related to at least one embodiment of the present disclosure described above can provide inertial driving guidance to a driver at a more efficient timing.

Particularly, since an inertial driving guidance timing optimized for each front deceleration situation and for each driver is determined, inertial driving guidance can be provided so that a driver may drive at a desired pass-through speed of a deceleration point.

The effects that can be achieved through the present disclosure are not limited to what has been particularly described hereinabove and other effects not described herein will be more clearly understood by persons skilled in the art from the above description.

The present disclosure may be implemented as computer-readable code that can be written on a non-transitory computer-readable medium in which a program is recorded. The computer-readable medium may be any type of recording device in which data that can be read by a computer system is stored. The aforementioned methods and embodiments may be carried out by the computer system or a processor. The processor is an electronic circuitry that can carry out the aforementioned methods or embodiments of the present disclosure. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage.

It will be apparent to those skilled in the art that various modifications and variations can be made in the present disclosure without departing from the spirit or scope of the disclosure. Thus, the present disclosure is intended to cover the modifications and variations of this disclosure within the scope of the appended claims and their equivalents.

What is claimed is:

1. A method of guiding an inertial driving timing of a vehicle, the method comprising:

Storing, by a processor, pass-through speeds for respective deceleration situation types;
Sensing, by a sensor, a deceleration situation on a route;
Calculating, by the processor, a target speed corresponding to a type of the sensed deceleration situation based on the stored pass-through speeds for the respective deceleration situation types; and
Determining, by the processor, an inertial driving guidance timing using the calculated target speed.

2. The method according to claim 1, wherein the storing comprises accumulatively storing the pass-through speeds.

3. The method according to claim 1, wherein the storing comprises storing the pass-through speeds regardless of whether the route is set through a navigation system.

4. The method according to claim 1, wherein the determining comprises determining the inertial driving guidance timing such that operation of an accelerator pedal is released at the inertial driving guidance timing to start inertial driving and the calculated target speed becomes the vehicle's speed when the vehicle passes through an occurrence point of the sensed deceleration situation.

5. The method according to claim 4, wherein the determining comprises calculating a required inertial driving distance corresponding to a distance required to reduce the vehicle's current speed up to the calculated target vehicle speed through inertial driving.

6. The method according to claim 5, wherein the calculating the required inertial driving distance is performed with reference to a pre-stored inertial driving distance profile with respect to different speeds of the vehicle.

7. The method according to claim 1, wherein the calculating the target speed is performed by averaging pass-through speeds corresponding to the type of the sensed deceleration situation among the stored pass-through speeds for the respective deceleration situation types.

8. The method according to claim 1, wherein the deceleration situation comprises at least one of
a shape or a type of a road,
a shape or a type of periphery of the road,
facilities on the road or the periphery of the road, or
variation in a driving direction according to route guidance.

9. The method according to claim 1, further comprising outputting inertial driving guidance information at the determined inertial driving guidance timing.

10. A non-transitory computer-readable recording medium in which a program for executing the method of guiding an inertial driving timing according to claim 1 is recorded.

11. A vehicle comprising:
a deceleration situation sensing unit configured to sense a deceleration situation; and
a guidance information control unit configured to
store pass-through speeds for respective deceleration situation types,
acquire information about the sensed deceleration situation from the deceleration situation sensing unit,
calculate a target speed corresponding to a type of the sensed deceleration situation based on the stored pass-through speeds for the respective deceleration event types, and
determine an inertial driving guidance timing using the calculated target speed.

12. The vehicle according to claim 11, wherein the guidance information control unit comprises a storage unit configured to accumulatively store the pass-through speeds for the respective deceleration situation types.

13. The vehicle according to claim 11, wherein the guidance information control unit stores the pass-through speeds for the respective deceleration situation types regardless of whether the route is set through a navigation system.

14. The vehicle according to claim 11, wherein guidance information control unit determines the inertial driving guidance timing such that an accelerator pedal is released at the inertial driving guidance timing to start inertial driving and the calculated target speed becomes the vehicle's speed when the vehicle passes through an occurrence point of the sensed deceleration situation.

15. The vehicle according to claim 14, wherein the guidance information control unit calculates a required inertial driving distance corresponding to a distance required to reduce the vehicle's current speed up to the calculated target vehicle speed through inertial driving.

16. The vehicle according to claim 15, wherein the guidance information control unit calculates the required inertial driving distance with reference to a prestored inertial driving distance profile with respect to different speeds of the vehicle.

17. The vehicle according to claim 11, wherein the guidance information control unit calculates the target speed by averaging pass-through speeds corresponding to the type of the sensed deceleration situation among the pass-through speeds for the respective deceleration situation types.

18. The vehicle according to claim 11, wherein the deceleration situation comprises at least one of
  a shape or a type of a road,
  a shape or a type of periphery of the road,
  facilities on the road or the periphery of the road, or
  variation in a driving direction according to route guidance.

19. The vehicle according to claim 11, further comprising an output unit configured to output inertial driving guidance information at the determined inertial driving guidance timing.

\* \* \* \* \*